May 4, 1943. J. C. HEINTZ 2,318,310
VULCANIZER HOIST
Filed Oct. 31, 1939

Inventor,
J. C. Heintz.
By Robert M. Pierson,
Attorney

Patented May 4, 1943

2,318,310

UNITED STATES PATENT OFFICE 2,318,310

VULCANIZER HOIST

James C. Heintz, Lakewood, Ohio

Application October 31, 1939, Serial No. 302,220

7 Claims. (Cl. 18—18)

This invention relates to power-operated molding presses such as those for retreading pneumatic tires and performing analogous operations. Its principal object is to provide work-hoisting and lowering means for loading and unloading the press through the action of a part of said press such as its upper member or cover. Further objects are to provide particular improved devices to that end, as will hereinafter appear.

Figure 1:
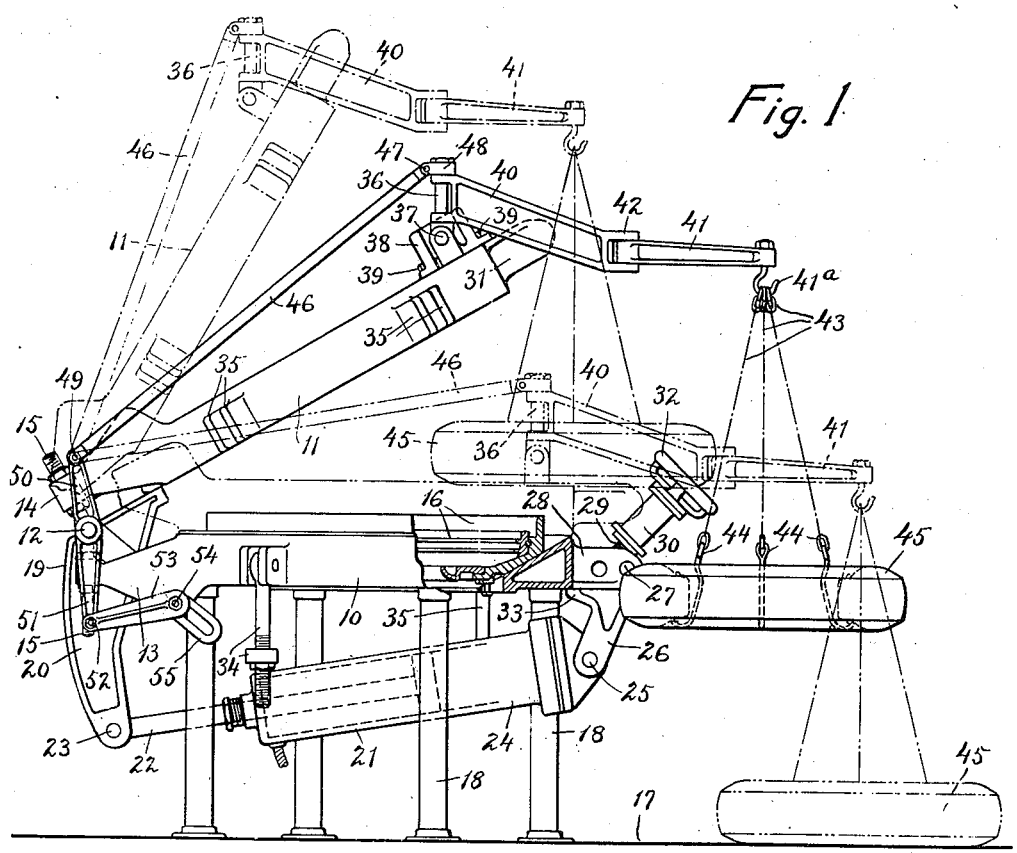

Of the accompanying drawing, Fig. 1 is a side elevation, partly broken away, of a watch-case tire-retreading vulcanizer equipped with crane-like loading and unloading apparatus in accordance with my invention, shown in partly-open position in full lines, and in closed and fully-open positions in broken lines.

Figure 2:
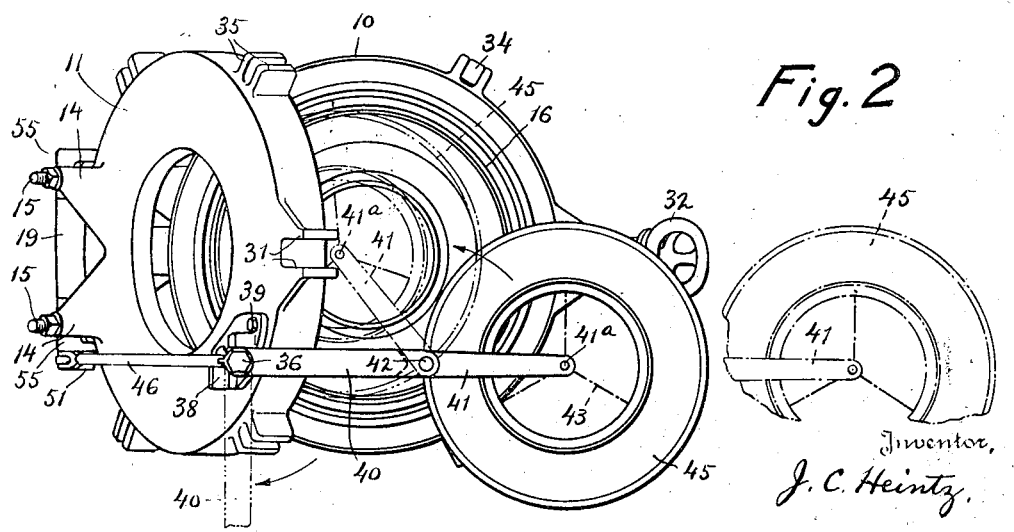

Fig. 2 is a plan view of the apparatus showing the fully-open position of vulcanizer cover and a corresponding position of the tire in full lines, with broken-line positions of the tire, respectively as supported on the floor and over the lower mold member, ready to be lowered into the latter.

The drawing shows this invention applied to a retreading vulcanizer having substantially the construction disclosed in my prior Patent No. 2,174,188 of Sept. 26, 1939.

In the drawing, 10 and 11 are fixed lower and movable upper steam-jacketed heater platens or press heads hinged together by a pin 12 extending through eyes of the usual adjusting bolts 15 mounted in hinge ears 13, 14 on the platens, to vary the spacing of said pin from the platens for different tire widths. The platens carry respective mating mold halves or members of which the lower one 16 is shown in the drawing. The lower platen 10 is horizontally supported from the floor 17 by legs 18.

19 is a central swinging hinge bracket on the upper platen 11, formed with a depending lever arm 20. The lower end of said arm suspends the rear end of a suitable motor, here shown as a fluid-pressure ram 21 extending longitudinally beneath the lower platen 10, said ram having its piston rod 22 pivoted to the arm at 23 and the bottom head or front end of its cylinder 24 hung by a pivot pin 25 upon the depending long arm of a bell-crank lever 26 pivoted at 27 between a pair of forwardly-projecting ears 28 integrally formed on the platen 10 opposite to the hinge 13, 14. To the short arm of said lever 26 is pivoted the lower end of a threaded bolt stem 29 which carries a double-flanged clamping and mold-cracking nut 30 which is adapted to operate either downwardly or upwardly upon a pair of front lugs 31 formed on the upper platen 11, when placed in an upright position between said lugs, or to be swung forwardly into the inoperative position shown in full lines, said nut having a hand wheel 32 at its upper end for turning it. The depending arm of lever 26 is considerably shorter than the hinge arm 20, and said lever is formed with a stop 33 to limit its clockwise rotation.

When the vulcanizer is to be opened by admitting hydraulic oil pressure into the left-hand end of the ram cylinder 22, forcing the ram piston into said cylinder, the first effect is to turn the lever 26 clockwise, by reason of mechanical advantage of the ram cylinder 24 thereover, as compared with the arm 20, so that the tire mold will be cracked or initially opened on its front side, until its stop 33 comes to rest on the lugs 28, whereupon further ram movement causes the arm 20 to swing the upper platen 11 toward and to a fully open position. The reverse operation of ram 21 closes the vulcanizer, and its swinging cover member or platen 11 is then clamped upon the lower platen 10 and upon the contained tire by means of the nut 30 and lugs 31, supplemented by the usual series of circumferentially spaced swinging-bolt clamps 34 on the platen 10 and pairs of lugs 35 on the platen 11.

The means embodying my invention utilizes the power-actuated hinged vulcanizer platen 11, together with additional apparatus preferably supplied as an attachment to the existing vulcanizer. Said additional apparatus includes a short journal post 36 carried at its lower end by a hinge pin 37 on a base bracket 38 which is attached by screws 39 on the upper face of platen 11, near the front of the latter and at one side of the longitudinal diameter of the vulcanizer. Upon the post 36 is pivoted a compound articulated arm consisting of an inner member 40 having a hub bearing adapted to turn horizontally about said post and an outer member 41 pivoted at 42 to the member 40. At its front end the arm member 41 carries a hook 41ᵃ from which are suspended, by means of three chains 43, a corresponding number of grappling hooks 44 to pass through a rim-mounted pneumatic tire 45 and engage the lower bead flange of its rim to raise or lower the tire.

For maintaining the pivot post 36 constantly in an upright position, I provide a parallelogram arrangement of linkage including said post as its front member, and a link 46 pivoted at its forward end, by means of a pin 47, to a collar 48 surrounding the upper end of said post, said link being pivoted at its rear end by a pin 49 upon the upper end of a fixed upwardly-projecting arm 50. The hub of said arm surrounds one end of the vulcanizer hinge pin 12 and is formed with a downward extension 51 anchored by a pivot pin 52 at the rear end of an arm 53 which is hingedly attached by a bolt 54 to the hinge member 13 of the lower platen 10, said bolt also serving to secure the slotted forward end of a brace member 55 which extends slantingly forward and downward from the hinge pin 12, so that the anchor arm 53 may swing vertically and the slotted brace member 55 may slide during adjustment of the vulcanizer hinge to accommodate different widths of tires.

To load into the lower platen 10 of the vulcanizer a raw tire 45 which rests upon the floor 17 or other platform adjacent to the forward side of the vulcanizer as shown in forward broken-line position in Figs. 1 and 2, the hinged lid or top platen 11 is lowered to close the vulcanizer, while the arm members 40, 41 are extended in a forward direction, the grapple hooks 44 are engaged under the lower tire rim flange, the cylinder of ram 21 is charged to swing platen 11 upwardly and raise the tire 45 through the full-line position shown in Fig. 1, while arm members 40, 41 remain extended until the tire has cleared the front edge of the lower platen 10. The upward swinging movement of platen 11 is continued to the full-open position indicated at the left in broken lines in Fig. 1 and in full lines in Fig. 2, and the compound arm 40, 41 is folded by manually swinging its inner member 40 outwardly and its outer member 41 inwardly to the respective broken-line positions shown in Fig. 2, thus carrying the tire 45 to an extreme inward position shown at the left in broken lines in Fig. 2 somewhat to the rear of the central axis of the vulcanizer. By partially discharging the ram cylinder, the platen 11 is lowered slightly while the raw-treaded tire is guided by hand to seat it centrally in the lower mold member 16. The grapple hooks 44 may then be released and swung out of the way by unfolding and swinging aside the crane arm members 40, 41 to permit closing of the heater and proceeding with vulcanization of the tire tread in the usual manner.

When the cure is complete, the vulcanizer is opened as previously described and the crane attachment may then be employed to strip the retreaded tire from the mold and unload it upon the floor or other platform by a reversal of the foregoing described loading operations.

It will be understood that my invention may be applied to other forms of vulcanizers or analogous apparatus having the required movements of a cover platen or analogous member, that any other suitable motor could be substituted for the illustrated fluid-pressure ram, and that the described embodiment of my invention could otherwise be varied without departing from its scope as defined in the claims.

I claim:

1. A tire-molding vulcanizer press comprising lower and upper press members, of which the upper member is mounted for vertical swinging movement, and a tire-hoisting and lowering arm mounted for horizontal swinging movement on said upper member.

2. A press according to claim 2 in which the arm is composed of inner and outer members hinged together for horizontal folding and unfolding movement, and tire-grappling means on the outer arm member.

3. A press according to claim 2 having an arm-pivoting post hingedly mounted on the movable press member, and means for maintaining said post in an upright position during the vertical swinging movements of said member.

4. A full-circle tire-tread vulcanizer comprising lower and upper press heads of which the upper head is pivoted on the rear of the lower head for swinging movement in a vertical plane, a tread-mold member on the lower head, a pivot post hingedly mounted near the front of the upper head, parallelogram linkage controlling said post for maintaining it upright during swinging movements of the upper head, and a foldable articulated hoist arm having an inner member mounted to swing horizontally on said post and, pivoted near the end of said inner member opposite to the end where it is mounted, an outer member provided with a grapple for engaging a tire by passing through the tire within the beads thereof and raising the work and depositing it in said mold member, and for unloading the finished work.

5. A vulcanizer according to claim 4 having a hinge pin connecting the press heads and carrying one end of the parallelogram linkage, and means for adjusting the spacing of said pin from the respective press heads for accommodating tires of different widths.

6. A work-hoist attachment for hinged wire vulcanizers, hinged at the rear comprising a bracket having means for attaching it near the front of the hinged lid of the vulcanizer, an upwardly-projecting journal post hinged at its lower end upon said bracket, means for maintaining said post in a substantially upright position during swinging movements of the supporting vulcanizer lid, and a foldable articulated hoist arm having an inner member journaled for horizontal swinging movement on said post and, foldably supported at one end by said inner member, an outer member provided with tire-holding means.

7. Mechanism according to claim 6, for attachment to a vulcanizer adjustable for different widths of tires, said mechanism having parallelogram linkage including the journal post as a front member, parallel thereto a rear arm adapted for fitting on the vulcanizer hinge pin, a link connecting the post and arm, and a guide member for said arm, attachable at one end to the lower vulcanizer member and pivoted at its other end to said arm to accommodate adjusting movements of said vulcanizer hinge pin.

JAMES C. HEINTZ.

CERTIFICATE OF CORRECTION.

Patent No. 2,318,310.

May 4, 1943.

JAMES C. HEINTZ.

It is hereby certified that error appears in the printed specification of the above numbered patent requiring correction as follows: Page 2, second column, line 5, claim 2, and line 10, claim 3, for the claim reference numeral "2" read --1--; and line 39, claim 6, for the word "wire" read --tire--; and that the said Letters Patent should be read with this correction therein that the same may conform to the record of the case in the Patent Office.

Signed and sealed this 22nd day of June, A. D. 1943.

Henry Van Arsdale,
Acting Commissioner of Patents (Seal)